(No Model.)
E. K. COOLEY.
INSOLE FOR BOOTS AND SHOES.
No. 271,798. Patented Feb. 6, 1883.
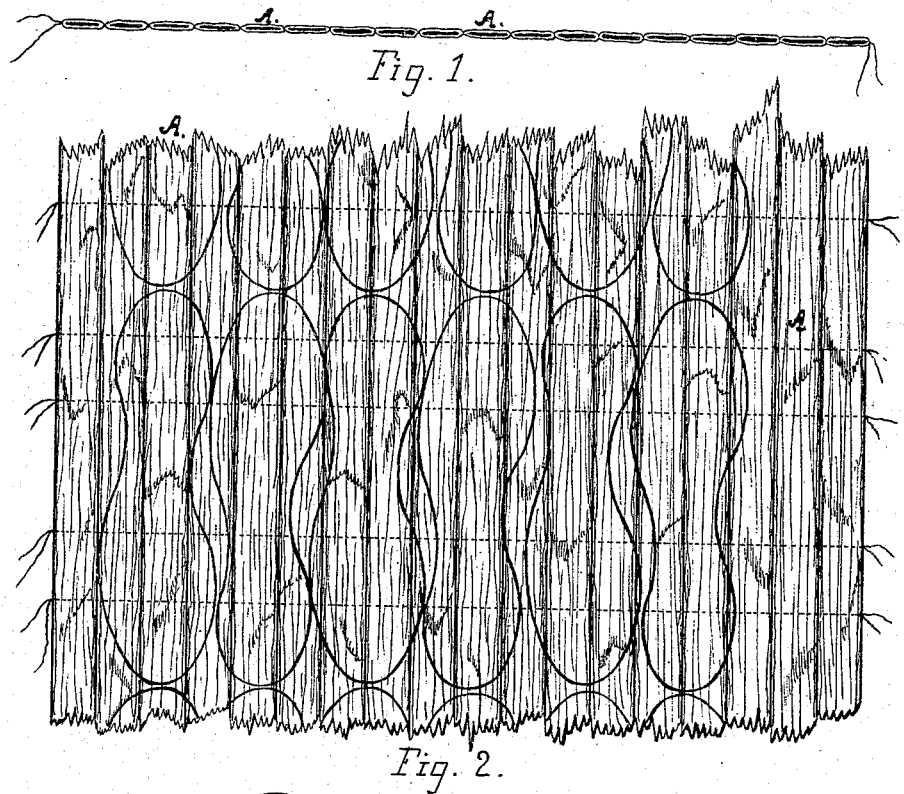
Fig. 1.
Fig. 2.
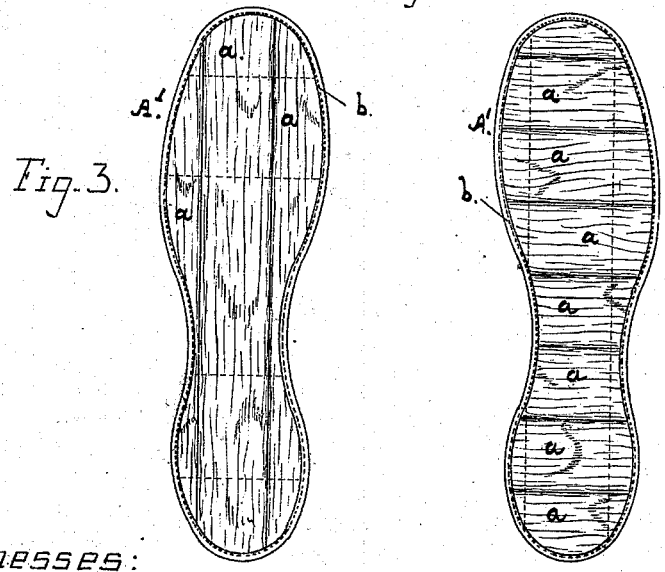
Fig. 3.  Fig. 4.
Witnesses:
J. A. Dickson
D. Selleck
Inventor:
Earl K. Cooley
By his Atty.,

UNITED STATES PATENT OFFICE.

EARL K. COOLEY, OF SAN FRANCISCO, CALIFORNIA.

INSOLE FOR BOOTS AND SHOES.

SPECIFICATION forming part of Letters Patent No. 271,798, dated February 6, 1883.

Application filed October 18, 1882. (No model.)

*To all whom it may concern:*

Be it known that I, EARL K. COOLEY, a citizen of the United States, residing in the city and county of San Francisco, State of California, have made and invented certain new and useful Improvements in Boot and Shoe Insoles; and I do hereby declare that the following is a full, clear, and exact description, reference being had to the accompanying drawings.

My invention relates to a new and useful improvement in the manufacture of insoles for boots and shoes.

It consists in making such insoles from the stalks of tule, flags, rushes, or other pithy stalks of grass, substantially as hereinafter described, whereby I produce an insole possessing non-absorbing and elastic qualities in a high degree, and capable of being manufactured and placed in the market at an exceedingly low cost. The insole also possesses great smoothness, and consequent ease to the wearer.

The following description fully explains the nature of my said invention and the manner in which I proceed to make, use, and carry out the same, reference being had to the accompanying drawings by letters and figures—that is to say—

Figure 1 is a section through a series of rushes united, being taken across the series. Fig. 2 is an elevation of the face of a similar series. Fig. 3 is an insole formed with the strips running longitudinally. Fig. 4 is an insole formed with the strips running crosswise.

I make and produce an insole, A', by joining together in required number stalks of tule-grass, *a*, suitably compressed or flattened to give an even, flat, and comfortable surface for the foot to rest on. After the stalks are joined together I protect the cut edges around the rim of the insole by a suitable binding, *b*. The method of forming such insole, which I prefer to employ in manufacturing them in large quantities, is substantially as follows: I first form a mat or large piece of material, A, by laying closely together a number of stalks previously flattened or compressed by being passed between rollers, or subjected to heavy pressure from weights. To join these pressed stalks together I run several lines of stitching at intervals across the stalks perpendicularly to their length by passing them through a sewing-machine. A machine of the kind adapted to manufacture heavy goods will answer the purpose, although a sewing mechanism specially adapted to sew several parallel lines of stitches is preferable. From such a blank, mat, or piece I then proceed to cut out the insoles of the required sizes by means of patterns, or by employing cutting-dies. The cut edges of the insoles thus produced I surround with a binding, *b*, either by sewing or by attaching it with gum or some suitable adhesive material. Instead of stitching these stalks together, they can be held by strips of cloth, paper, or flexible material pasted across the bottom, or they can be fixed upon a backing of such material and then cut into shape.

In the drawings, A, Figs. 1 and 2, represents the mat or blank, and A', Figs. 3 and 4, the finished sole.

From such inexpensive and cleanly material I thus produce an elastic, durable, and highly-comfortable insole. The stalks of tule-grass I find to be particularly adapted for this purpose; but in sections of country where this grass is not to be had the stalks of flags and rushes can be used in the manufacture of these insoles.

Insoles have heretofore been made of plaited straw. This is an essentially different growth from the tule, rushes, or flags of which I form my insole. Straw is hollow, and at intervals has hard joints, which would form knots or projections when in use. When plaited it would present sharp corners. Being plaited up the sides of the straw are crushed in and the elasticity and softness almost entirely destroyed. The tule-grass is open to no such objections. Its pithy core makes it always elastic and soft. It has no joints. As treated to form the flat insole it presents no sharp corners, and is perfectly smooth.

Having thus fully described my invention, what I claim, and desire to secure by Letters Patent, is—

An insole for boots and shoes composed of tule-grass, flags or rushes, flattened, laid edge to edge, and united in this plane condition, substantially as set forth.

EARL K. COOLEY. [L. S.]

Witnesses:
EDWARD E. OSBORN,
GEO. VINCENT.